Patented Nov. 7, 1922.

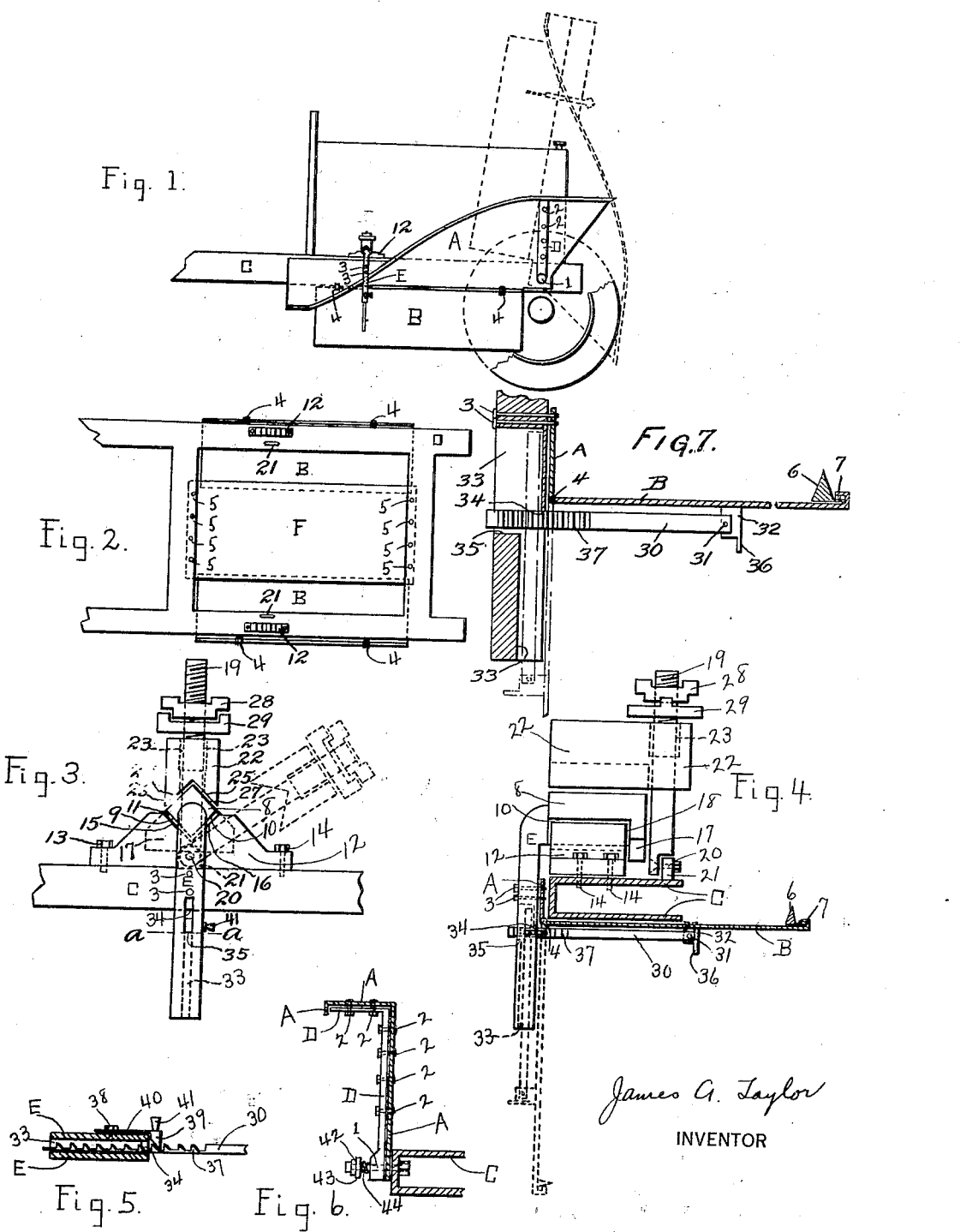

1,434,929

UNITED STATES PATENT OFFICE.

JAMES A. TAYLOR, OF NEW YORK, N. Y.

MUD GUARD FOR VEHICLES.

Application filed January 11, 1918. Serial No. 211,365.

*To all whom it may concern:*

Be it known that I, JAMES A. TAYLOR, a citizen of the United States, residing at the borough of Manhattan, in the county, city and State of New York, have invented certain new and useful Improvements in Mud Guards for Vehicles, of which the following is a specification.

The modern automobile engine is of such complicated construction that it requires frequent attention and adjustment. Many parts such as the carbureter, generator, magneto, valves, etc., are situated under the hood of the engine and these parts can be reached only by leaning over the mud-guard or crouching or bending under the same. This is not only a painful and clothes soiling operation but one that militates against the efficiency of the work and prevents continuing it for any considerable time uninterruptedly. It is also impossible for the operator to come close to and see plainly the parts upon which he is working. This is true not only of the mud-guard but also of the dust-pan proper (which is also in a sense a mud-guard as its main purpose is to prevent dust and mud from passing upward under the hood into the mechanism) to remove which is a difficult and disagreeable task. Most of the above mentioned parts under the hood lie close to the outside frame of the vehicle and could, provided the dust-pan were not in the way, be easily reached from below without getting beneath the vehicle. For this purpose the space of a foot beyond the frame is ample to permit of free access to the engine parts.

The objects of my invention are to provide a vehicle mud-guard a part of which serves as a combined mud-guard and dust-pan which can by unscrewing a double nut or loosening any other suitable form of fastening be quickly loosened and swung out of the way of a person desiring easy access to the motor of the vehicle either from the side or from underneath. The construction is such that it is not necessary to detach the mud-guard or dust-pan from the vehicle, but the same can be swung on pivots to a substantially horizontal position and easily secured firmly in place by locking mechanism.

To such ends my said invention in its preferred form consists of a vehicle wheel mud-guard in two parts attached to the vehicle by two supports one of which is pivoted to permit the rocking or vibration of the mud-guard on the pivot, and the other of which can be securely fastened to the frame of the vehicle while the vehicle is in use; one part of the mud-guard being substantially of the usual type and the other hinged or jointed to it in such manner that it can be projected under the motor of the vehicle and secured there in such a way that it completes the mud-guard and leaves no aperture for the passing of mud, dust and other substances thrown upward by the wheels, and at the same time takes the place of a part of the dust-pan beneath the motor; and means for securing the second dust-pan portion of the mud-guard in position.

While in the drawings herein I have shown a right hand mud-guard, it is obvious that my invention is applicable to either a right hand or a left hand mud-guard by the mere adjustment of the various parts of the device.

My said invention is fully shown, described and claimed in the following specification of which the accompanying drawings form a part; wherein letters or numerals of reference designate like or equivalent parts, wherever found throughout the several views, and in which:—

Figure 1 is a right hand side view of my new and improved combined adjustable mud-guard and dust-pan showing its relation to an automobile and showing in dotted lines the position taken by the same when its position has been changed so as to permit of access to and more convenient work upon the motor of the vehicle.

Figure 2 is a top view of the forward part of the frame of an automobile equipped with my new and improved combined mud-guard and dust-pan showing the parts of the dust-pan in the position taken by the same when in use, together with a permanently fixed portion of a dust-pan.

Figure 3 is a detailed view of the bracket arm of my new and improved combined mud-guard and dust-pan, the securing socket for the same, adjustable catch and securing nuts in place on a securing bolt, showing in dotted lines the catch, and securing mechanism elevated on the securing-bolt when the position of the same is changed so as to permit the bracket arm to be raised.

Figure 4 is a side view of the bracket arm and securing-bolt, catch and nuts shown in Fig. 3, the frame of the vehicle, the mud-guard and the dust-pan parts in cross section, and the locking device to secure the latter in position and permit a change of position of the latter, and in dotted lines the movable mud-guard portion of the dust-pan let down so as to permit changing the position of the entire device.

Figure 5 is a side view in detail and section of securing bracket arm and the pawl and ratchet in mid position during the shifting operation taken at the line *a—a* on Figure 3.

Figure 6 is a detail view of the pivoted forward supporting bracket arm of the mud-guard, shown in Fig. 1, together with a cross section of the wheel mud-guard, the spring to take up the motion in the pivoted bracket arm and double-nuts to secure the latter on the pivot.

Figure 7 is a cross section of the rear support bracket arm taken on a vertical plane through the center of the face of the arm appearing in Figure 3, and showing the slot in the same through which the bar passes which supports the dust-pan mud-guard part and maintains the same in mud-guarding position.

Referring to the drawing:

My said new and improved combined mud-guard and dust-pan for vehicles comprises a mud-guard consisting of two sections, A and B, Figs. 1, 2 and 4 supported on the frame of the vehicle C by the bracket arms D and E. The bracket arm D is supported on the threaded pivot-bolt 1, Figs. 1 and 6, which is securely attached to the frame C in such manner as to allow the entire mud-guard mechanism to rock or vibrate upon the pivot-bolt, into and out of mud-guarding position.

The wheel mud-guard A, is of the usual type and is secured to the bracket arm D by bolts 2, 2, Figs. 1, and 6, and to the bracket arm E by the bolts 3, 3, 3, but is not secured permanently to the frame of the vehicle except as described. The dust-pan mud-guard B is hinged to the part A by hinges 4, 4, Figs. 1, and 2 in such manner that when secured in a horizontal position it extends underneath the frame and motor of the vehicle so as to form a side portion of what is usually termed the dust-pan. When such part B is so secured in position on both the right and left mud-guards of the vehicle substantially two thirds of the area beneath the motor is covered by such dust-pan portions of the mud-guards, while the central, intervening space is covered by the usual dust-pan F securely attached to the frame of the vehicle by bolts, 5, 5, 5, Fig. 2. The upright portion of the part A and the part B are here shown for convenience as flat surfaced sheets of metal, but may be moulded or shaped so as to conform to the shape of the particular vehicle frame or motor on which it is desired to use the same. The part B is provided for its entire length with a strip of felt or leather 6 one edge of which is wedged into the slot 7 (Fig. 4) formed by rolling up the outer edge of the part B so as to prevent noise of vibration when the part B is pressed up against the central dust-pan F and also to prevent the dripping to the ground of oils and liquids from the engine.

The arm E is permanently secured to the part A and provided at its upper end with a diamond shaped securing head 8, the lower two faces of which 9 and 10 rest in a groove 11 in a block 12 secured to the frame of the vehicle C by the bolts 13 and 14, the faces of which block 15 and 16 are of the same size, shape and slant as the faces 9 and 10, while the part 8 is provided with a flange 17 at its outer end which when in the normal mud-guarding position abuts against the inner face 18, (Fig. 4) of the block 12 and which flange extends below the bottom of the wedged shaped groove in the block 12 so as to prevent lateral movement of the arm E and consequently of the mud-guard parts.

The threaded bolt 19 (Figs. 3 and 4) is secured by a pivot-bolt 20 to the block 21 on the frame C in such manner as to permit the bolt 19, to be swung to the right or left as is shown in dotted lines in Fig. 3, when it is desired to lift the head 8 out of the groove in the block 12 so as to permit change of position of the entire mud-guard mechanism.

The securing block 22, (Figs. 3 and 4) is held in position by the bolt 19 passing through the slot 23 in the block 22, said block being provided on its under side with a wedge shaped groove having the faces 24 and 25 of the same size, shape and slant as the upper faces 26 and 27 of the head 8 upon which faces 26 and 27, the faces 24 and 25 abut and are held in position by the threaded-nuts 28 and 29, (Figs. 3 and 4) on the threaded bolt 19 above the block.

The section B of the mud-guard is raised into and secured in position by means of an arm 30, (Fig. 4) pivotally secured by the bolt 31, to the projecting block 32 on the under surface of the section B. The arm 30 moves in a slot 33 with the support arm E (Figs. 3, 4, 5 and 7) slightly wider than the arm 30. The face of the slot 33 35 is lower and back of the face 34 of the same slot by a slightly greater distance than the width of the arm 30. The slot 33 extends up into the member E above the face 35. The top of the slot 33 is a greater distance from the bolt 31, when the part B is in lowered position than the length of the arm 30. The slot 33 continues down the length of the member E below the face 34. The arm 30 therefore moves freely in the slot 33 while the part B is being lowered from a horizontal position.

Integral with and extending outward from the block 32, is a projection 36 (Fig. 4) adapted to act as a pedal for use in lifting the section B into the normal horizontal, dust-pan closing and mud-guarding position.

The arm 30 (Figs. 4 and 5) is provided with a ratchet 37. Secured to the bracket arm E by the bolt 38 is a pawl 39, the shank 40 of which is composed of resilient metal, the same being secured in such position as to tend to keep the pawl 39 constantly engaged with the teeth of the ratchet 37. The teeth of such ratchet 37 are turned outward so as to engage the pawl 39 when the section B is moved into position horizontally. The pawl 39 is provided at its outer end with a handle 41 (Fig. 5), by which the pawl 39 is lifted from engagement with the teeth of the ratchet 37 when it is desired to release the section B and permit the same to fall into a perpendicular position to allow the wheel mud-guard to be raised out of its normal mud-guarding position.

The bracket arm D, pivoted to the frame C, (Fig. 6) is permanently secured to the part A and is held in position on the threaded pivot-bolt 1 by the threaded-nuts 42 and 43 screwed on the threaded pivot-bolt 1. Interposed between the bracket arm D, and the nuts 42 and 43 is a stiff coil spring 44 carried on the pivot-bolt 1, which is adapted to take up and damp any vibration in the bracket arm D, when the same is agitated by the motion of the vehicle, and in this way any possible noise is deadened.

The operation of my improved combined wheel and dust-pan mud-guard is as follows: To secure the mud-guard in mud-guarding position the bolt 19 is swung to one side, and the bracket arm E is lowered until the securing head 8 rests in the groove 11. The bolt is then raised to a perpendicular position, and the block 22 is pressed down upon the part 8. The nuts 28 and 29 are then screwed down upon the block 22, which is thus held tightly in place so as to prevent movement when the vehicle is in motion. The section B is then secured in position by placing the foot or hand against the projection 36 and pushing the same forward and upward as far as it will go. The pawl 39 then engaging the teeth of the ratchet prevents a change of position of the section B. To change the position of the entire combined mud-guard mechanism, the pawl 39 is first lifted out of engagement with the teeth of the ratchet 37 by grasping the handle 41 and pulling upon the same. The section B then falls into a perpendicular position, so as to be out of the way of the frame C or other parts of the mechanism when the entire mud-guard is lifted out of mud-guarding position. The nuts 28 and 29 are then unscrewed so as to permit the raising of the block 22 and the swinging to one side of the bolt 19. The entire mud-guard mechanism is then rocked or tilted forward on the pivot 1 sufficiently far to be out of the way of one desiring access to the motor and sufficiently far so as not to permit the same to fall backward toward the rear of the vehicle. The pivot or center of rotation of the entire mud-guard is higher than the center of the forward wheel and hence the front of the wheel mud-guard will come into contact with the front tire when the entire mud-guard is in the raised position and will thus be held and locked in the raised position.

It is evident that many changes and modifications in the construction combination and arrangement of the several parts of my said invention may be made without departing from the scope of my invention; and I do not intend to limit myself to that shown.

I claim:

1. In a motor-vehicle, a front-wheel mud-guard, extending when in the guarding position back over the wheel; and a pivot-joint securing the mud-guard to the vehicle adjacent to the forward end of the mud-guard.

2. In a motor-vehicle, a front-wheel mud-guard, extending when in the guarding position back over the wheel; and a pivot-joint securing the mud-guard to the vehicle adjacent to the forward end of the mud-guard, the construction and arrangement being such that when such mud-guard is thrown tiltingly upward and forward to the limit of its movement upon the pivot-joint, it will be retained in such position by its own gravity so as to permit free access to the motor-mechanism beneath the hood, and also access to the tonneau body through the adjacent side-door.

3. In a motor-vehicle, a front-wheel mud-guard, extending when in the guarding position back over the wheel; a pivot-joint securing the mud-guard to the vehicle adjacent to the forward end of the mud-guard, the construction and arrangement being such when such mud-guard is thrown tiltingly upward and forward to the limit of its movement upon the pivot-joint, it will be retained in such position by its own gravity and mechanism for locking the mud-guard in the lowered and mud-guarding position.

4. In a device of the class described, a vehicle mud-guard comprising an outer wheel mud-guard part, and a mud-guard part extending beneath the vehicle to form a portion of the bottom of the dust-pan; means for securing both mud-guard parts in position, and means for changing the position of the mud-guard parts without disengaging the mud-guard parts from the vehicle.

5. In a device of the class described, a vehicle mud-guard comprising an outer wheel mud-guard part and an inner mud-guard part extending beneath the vehicle; means for securing both mud-guard parts in mud-guarding position; means for changing the position of the mud-guard pivotally into non-mud-guarding position without disengaging the mud-guard from the vehicle; and means for locking the same in such non-mud-guarding position.

6. In a device of the class described, a vehicle mud-guard consisting of two mud-guarding parts secured together by hinges; means for securing one of such parts in horizontal position beneath the chassis and mechanism of the vehicle, means for removing such part from beneath the chassis and mechanism, means for securing the other of such parts in horizontal mud-guarding position outside the chassis of the vehicle and above the wheel, and means for simultaneously tilting both parts into vertical position.

7. In a device of the class described, a vehicle mud-guard consisting of two parts one of which is adapted to be secured beneath the motor mechanism of the vehicle to form a side portion of the dust pan bottom; means for removing such part from such position, and the other part adapted to form an outer wheel mud-guard; means for securing the latter in position by a support at its forward end pivoted to the frame of the vehicle and means for changing the position of both parts from a horizontal position to a substantially vertical position while both of such parts are attached to such vehicle.

8. In a device of the class described, a vehicle mud-guard consisting of two parts secured together by hinges, means for securing the same to the vehicle consisting of two bracket supports one of which is mounted pivotally upon the vehicle above and adjacent to the forward axle thereof and the other of which is secured to the mud-guard adjacent to the rear thereof, means for securing the second support to the vehicle and means for changing the position of the mud-guard parts so that the mud-guard will be free to pass the chassis of the vehicle when the mud-guard is tilted.

9. In a device of the class described, a vehicle mud-guard consisting of two parts, an upper wheel mud-guard part and a lower engine mud-guard part extending beneath the chassis of the vehicle, secured together by hinges; means for securing the mud-guard to the vehicle consisting of two bracket-supports, one of which is mounted pivotally upon the vehicle adjacent to the forward axle thereof and the other of which is mounted upon the upper mud-guard part adjacent to the rear thereof; means for securing the second bracket-support to the frame of the vehicle; means for securing the engine mud-guard part in mud-guarding position; means for changing the position of such mud-guard part so that it will be free to pass the chassis of the vehicle when the mud-guard is tilted.

10. In a device of the class described, a vehicle mud-guard consisting of two parts secured together by hinges one of which parts extends beneath the chassis and motor of the vehicle, means for deadening the sound of vibration of such part and preventing the escape of liquids from such part, and the other of which parts is outside of the chassis of the vehicle, means for securing the mud-guard to the vehicle consisting of two bracket-supports, one of which is mounted pivotally upon the vehicle above and adjacent to the forward axle thereof and the other of which is free to change its position, means for securing the second support to the vehicle, and means for changing the position of the mud-guard while attached to the vehicle.

11. The combination with a motor vehicle, of a front wheel mud-guard pivoted to the vehicle frame at the forward end in such manner as to be capable of being thrown to vertical position upon its pivot and retained in such position; a second combined dust-pan bottom and mud-guard pivotally secured to the inner edge of the wheel mud-guard so as to be swung forward into vertical position simultaneously therewith; and means for locking the dust-pan mud-guard in a horizontal position beneath the dust-pan of the vehicle when the two mud-guards are in lowered position.

12. The combination with a vehicle, of a wheel mud-guard pivoted at its forward end to the vehicle frame in such manner as to be capable of being thrown into vertical position, means for retaining the same in raised and in lowered position; and means for damping and deadening the vibration of such mud-guard when in lowered and mud-guarding position.

13. The combination with a vehicle of a mud-guard comprising an outer mud-guard part and a dust-pan mud-guard part hinged together; means for changing the position of the mud-guard without detachment from the vehicle and means for changing the position of the dust-pan mud-guard without detachment from the vehicle and without changing the position of the outer mud-guard part.

14. The combination with a vehicle of a front-wheel mud-guard; a supporting-bracket attached to the vehicle-frame adjacent to the rear of the front traction wheel of the vehicle, forming a pivotal support for the mud-guard in connection therewith adjacent to the front end of the mud guard, whereby when the mud-guard is thrown forward upon the pivotal support so formed to the limit of its movement it will, by its own gravity be maintained in such position so as to simultaneously allow free access to the motor-mechanism and to the tonneau or body portion of the vehicle.

Signed at the borough of Manhattan, city, county and State of New York, this fifth day of January, 1918.

JAMES A. TAYLOR.

Witnesses:
WILLIAM A. BASSETT,
DARRELL HEVENOR SMITH.